(12) United States Patent
Lee et al.

(10) Patent No.: US 7,622,540 B2
(45) Date of Patent: Nov. 24, 2009

(54) METAL CARBONATE INITIATOR AND METHOD FOR POLYMERIZING ISOCYANATES USING THE SAME

(75) Inventors: Jae-Suk Lee, Gwangju (KR); Hee-Soo Yoo, Gwangju (KR); Shahinur Rahman, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 128 days.

(21) Appl. No.: 11/819,630

(22) Filed: Jun. 28, 2007

(65) Prior Publication Data
US 2008/0027204 A1 Jan. 31, 2008

(30) Foreign Application Priority Data
Jul. 25, 2006 (KR) .................. 10-2006-0069998

(51) Int. Cl.
*C08G 18/22* (2006.01)
*C07C 65/32* (2006.01)

(52) U.S. Cl. .................. 528/57; 528/48; 562/459; 562/460; 502/150; 502/161; 502/172

(58) Field of Classification Search .................. 528/57, 528/48; 502/150, 161, 172; 562/459, 460
See application file for complete search history.

(56) References Cited

U.S. PATENT DOCUMENTS

| 4,379,905 | A | * | 4/1983 | Stemmler et al. | ............. 528/73 |
| 4,518,761 | A | | 5/1985 | Richter et al. | |
| 2002/0165333 | A1 | | 11/2002 | Lee et al. | |
| 2004/0034186 | A1 | * | 2/2004 | Lee et al. | ...................... 528/44 |
| 2005/0209426 | A1 | | 9/2005 | Lee et al. | |

FOREIGN PATENT DOCUMENTS

| KR | 2002-0069307 | 8/2002 |
| KR | 2003-0082274 | 10/2003 |

OTHER PUBLICATIONS

European Search Report, dated Oct. 25, 2007.
Ahn, et al., "*Unprecedented Control over Polymerization of n-Hexyl Isocyanate using an Anionic Initiator Having Synchronized Function of Chain-End Protection*," J. Am. Chem. Soc., vol. 127, No. 12, pp. 4132-4133 (2005).
Bur, et al., "*The Chain Structure, Polymerization, and Conformation of Polyisocyanates*," Chemical Reviews, vol. 76, No. 6, pp. 727-746 (1976).
Fukuwatari, N., "*Lanthanoid isopropoxide as a novel initiator for anionic polymerization of isocyanates*," Macromol. Rapid Commun., vol. 17, pp. 1-7 (1996).
Patten, et al., "*'Living' Titanium(IV) Catalyzed Coordination Polymerizations of Isocyanates*," J. Am. Chem. Soc., vol. 113, pp. 5065-5066 (1991).
Patten, et al., "*Organotitanium(IV) Compounds as Catalysts for the Polymerization of Isocyanates: The Polymerization of Isocyanates with Functionalized Side Chains*," Macromolecules, vol. 26, No. 3, pp. 436-439 (1993).
Patten, et al., "*Organotitanium(IV)-Catalyzed Cyclopolymerizations of 1,2-Diisocyanates and Cyclocopolymerizations of Monoisocyanates with 1,2-Diisocyanates*," Macromolecules, vol. 29, No. 18, pp. 5882-5892 (1996).
Wang, et al, "*One-Pot Formation of a Reactive Polymer Possessing Anion Sites along the Polymer Backbone and Its Application to Graft Polymerization of ε-Caprolactone*," Macromolecules vol. 29, No. 7, pp. 2707-2708 (1996).

* cited by examiner

*Primary Examiner*—Irina S Zemel
*Assistant Examiner*—Michael Leonard
(74) *Attorney, Agent, or Firm*—Harness, Dickey & Pierce, P.L.C.

(57) ABSTRACT

Disclosed herein is a metal enolate initiator for polymerizing isocyanates and a method for polymerizing isocyanates by anionic polymerization using the same, in which the initiator forms a cluster upon the initiation and protects stability of terminal anions at the end of the chain to cause controlled polymerization, thus preventing depolymerizaton and improving reaction time and efficiency without the use of a separate additive.

3 Claims, 5 Drawing Sheets

US 7,622,540 B2

METAL CARBONATE INITIATOR AND METHOD FOR POLYMERIZING ISOCYANATES USING THE SAME

CROSS-REFERENCE TO RELATED APPLICATION

This application claims the benefit of Korean Patent Application No. 10-2006-0069998, filed on 25 July, 2006, the entire disclosure of which is hereby incorporated by reference.

BACKGROUND OF THE INVENTION

1. Field of the Invention

The present invention relates to an initiator for polymerizing isocyanates, more particularly, to a metal enolate initiator for polymerizing isocyanates and a method for polymerizing isocyanates by anionic polymerization using the same, in which the initiator forms a cluster upon the initiation and protects stability of terminal anions at the end of the chain to cause controlled polymerization, thus preventing depolymerizaton and improving reaction time and efficiency without the use of a separate additive.

2. Description of Related Art

In general, polyisocyanates are prepared by anionic polymerization [Bur, A. J.; Fetters, L. J. Chem. Rev. 1976, 76, 727.]. Typically, the anionic polymerization is carried out using NaCN as an initiator and N—N-dimethylformamide (DMF) as a solvent at a temperature of −60° C. However, like the polymerization of methylmethacrylate (MMA), which is a polar monomer similar to the polyisocyanate, the anionic polymerization of isocyanates tends to form a thermodynamically stable trimer by a backbiting reaction in which the active anion at the end attacks the carbonyl group of the main chain. As a result, it is difficult to control the molecular weight of a polymer and to obtain a monodispersed polymer. Moreover, the anionic polymerization of isocyanates requires extreme reaction conditions such as high vacuum and low temperature due to a high reactivity of an isocyanate monomer.

A method for controlling the polymerization of isocyanates has been a very difficult problem for numerous researchers, and extensive research aimed at polymerizing isocyanates with a controlled structure by the anionic polymerization has continued to progress.

As an example, Fukuwatari et al. have prepared an anionically polymerized n-hexylisocyanate using lanthanoid isopropoxide as an initiator [Fukuwatari, N.; Sugimoto, H.; Inoue, S. Macromol. Rapid Commun. 1996, 17.]. As a result of the reaction, the polymer was obtained in the yield of 90% at a polymerization temperature of −78° C. While it is very difficult to obtain the polymer at a temperature higher than −40° C. via the general polymerization due to trimerization, a polymer was obtained in a high yield of 73% even at a temperature of −30° C. With this, it was proved that lanthanoid isopropoxide is a more effective initiator than NaCN and also that the polymerization is possible at a relatively higher temperature.

Moreover, Tsuyosi et al. have prepared a homopolymer of hexylisocyanate using yttrium isopropoxide as an initiator at room temperature [Ikeda, T.; Sugimoto, H.; Inoue, S. J. M. S.—Pure Appl. Chem. 1997, A(34), 1907.]. Although this polymerization offered an improved yield, it was difficult to control the molecular weight and to obtain a monodispersed polymer, and thereby it was impossible to find a condition for living polymerization.

Meanwhile, another difficulty raised in the polymerization of isocyanates is solubility to a solvent.

Since the solubility of a monomer and a polymer obtained at low temperature to dimethylformamide (DMF), a commonly used solvent, is not good, the molecular weight distribution becomes broader and the yield decreases. In order to overcome these problems, Okamoto Y. et al. used toluene and DMF as co-solvents. As a result, the yield was improved, but there was no noticeable improvement in the molecular weight distribution. In order to overcome the low solubility problem, the use of tetrahydrofuran (THF) as a solvent was proposed. In this case, however, it was observed that the formation of dimers and trimers became more serious.

Wang J. et al. have synthesized polyisocyanates using $SmI_2$, which is a lanthanide compound [Wang, J.; Nomura, R.; Endo, T. Chem. Lett. 1996, 10, 909: Macromolecules, 1996, 29, 2707.]. However, there were still some drawbacks in that the yield was as low as 32% to 70%, and the molecular weight distribution was as uncontrollable as 2 to 4.

Novak B. M. et al. have prepared a variety of isocyanates by living coordination polymerization using $CpTiCL_2(OR)$, etc. [Patten, T. E.; Novak, B. M. J. Am. Chem. Soc. 1991, 113, 5065.: Macromolecules 1993, 26, 436.: Macromolecules 1996, 29, 5882.]. In this case, however, there were also some drawbacks in that a catalyst system, which was very complex and expensive, should be used for the coordination polymerization, the yield was still lower than 100%, and copolymerization with other monomers was not possible.

Okamoto Y. et al. have polymerized aromatic polyisocyanates under polymerization conditions of tetrahydrofuran solvent and −98° C., using chiral lithium amides of (S)-(−)-(2-methoxymethyl)pyrrolidone and (S)-(+)-(2-pyrrolidonylmethyl)pyrrolidone, or using chiral alkoxides of 1,2,5,6-diisopropylidene-D-glucose, (−)-menthol, (−)-borneol, and (2S, 3R)-(+)-4-dimethylamino-1,2-diphenyl-3-methyl-2-butanol. However, they did not take into considerations of various parameters for living conditions and for structure-control, such as reaction time, counter ion, and the like.

Meanwhile, the inventors of the present invention have disclosed polyisocyanates having various functional groups and a preparing method thereof in Korean Patent No. 10-0419845, in which a common-ion salt is used to prevent the formation of dimers and trimers due to stable metal ions, thus providing polyisocyanates with controlled molecular weight and improved properties. However, it has a difficulty in the process due to the use of an additive.

Moreover, the inventors of the present invention have disclosed a novel initiator for polymerizing isocyanates having a variety of functional groups in Korean Patent No. 10-0454095, in which a metal amidate is used as the novel initiator to quantitatively obtain a controlled polymer by effectively preventing depolymerizaton without the use of an additive. However, it has some drawbacks such as long reaction time and low initiation efficiency due to a low reactivity of the amidate anion.

As described above, according to the conventional methods for preparing polyisocyanates, it is difficult to control the molecular weight due to the formation of dimers or trimers, and they have some drawbacks such as a difficulty in the process due to the use of an additive, deterioration of reaction yield due to the low reactivity, and a broad molecular weight distribution. Accordingly, a new method for polymerizing isocyanates, which can solve the above-described drawbacks to control the molecular weight and its structure and to and provide improved reaction efficiency, is highly need.

As a result, the inventors of the present invention have confirmed that, if isocyanate monomers having a variety of functional groups including alkyl and aryl are subjected to anionic polymerization using a specific metal enolate compound as a initiator at a high vacuum and an extremely low temperature without the use of an additive, it is possible to effectively prevent depolymerizaton as the initiator molecules form a cluster upon the initiation, to reduce the formation of dimers and trimers, and to facilitate the control of monodispersity and molecular weight, thus polymerizing the polyisocyanate under more stable conditions, and it is also possible to reduce the required reaction time thanks to the reactivity of a carbanion higher than that of the amidate anion of the conventional metal amidate and to improve the initiation efficiency, and completed the present invention.

SUMMARY OF THE INVENTION

Accordingly, an object of the present invention is to provide a metal enolate initiator for polymerizing isocyanates and a method for polymerizing isocyanates by anion polymerization using the same that can prevent depolymerizaton and improve reaction time and efficiency without the use of a separate additive.

In an aspect, the present invention provides a metal enolate initiator for polymerizing isocyanates, represented by the following Formula 1:

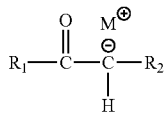

[Formula 1]

wherein M is an alkali metal selected from the group consisting of Li, Na, K, and Cs, and $R_1$ and $R_2$ represent an alkyl group or an aromatic group having 1 to 20 carbon atoms, respectively.

In another aspect, the present invention provides a method for polymerizing isocyanates by anionic polymerization using an isocyanate monomer and a metal enolate initiator represented by Formula 1.

DETAILED DESCRIPTION OF THE INVENTION

Figure 1:
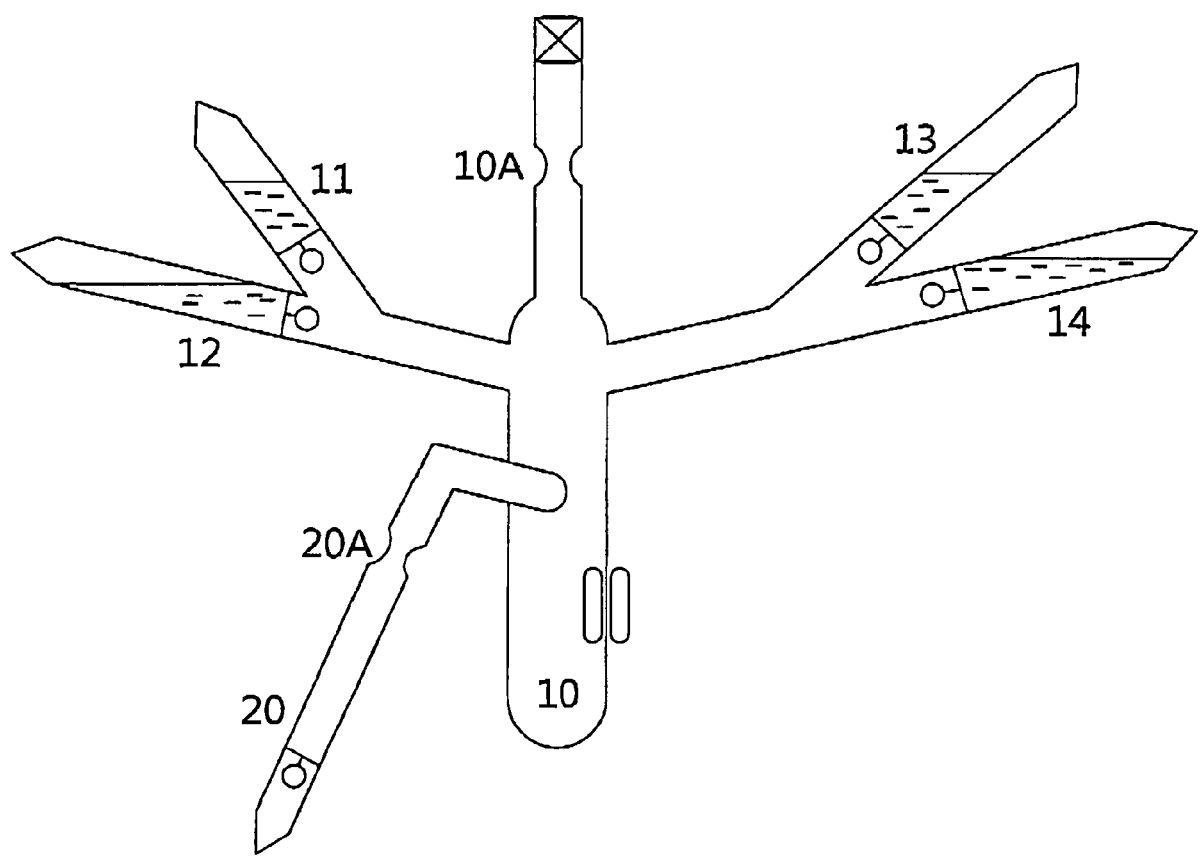
FIG. 1 is a schematic diagram of an anionic polymerization unit used in the synthesis of a homopolymer of the present invention.

Hereinafter, preferred embodiments in accordance with the present invention will be described with reference to the accompanying drawings. The preferred embodiments are provided so that those skilled in the art can sufficiently understand the present invention, but can be modified in various forms and the scope of the present invention is not limited to the preferred embodiments.

The present invention provides a method for polymerizing isocyanates by anionic polymerization using a metal enolate compound represented by the following Formula 1 as an initiator:

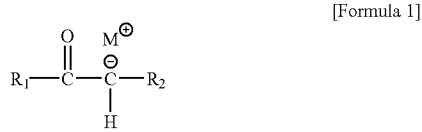

[Formula 1]

wherein M is an alkali metal selected from the group consisting of Li, Na, K, and Cs, and $R_1$ and $R_2$ represent an alkyl group or an aromatic group having 1 to 20 carbon atoms, respectively.

The metal enolate compound of Formula 1 itself is well known in the art; however, there have been no attempts to use the metal enolate compound as an initiator of a polymerization reaction and, especially, the metal enolate compound of Formula 1 has not been applied to the anionic polymerization for the preparation of polyisocyanate. That is, a technical feature of the present invention resides in the metal enolate initiator used in the polymerization of isocyanates, not in a novel metal enolate compound.

The metal enolate initiator represented by Formula 1 is prepared using an alkali metal salt such as a lithium salt, a sodium salt, a potassium salt, a cesium salt, etc., and it is preferable that the sodium salt be used.

A method for preparing the metal enolate initiator commonly used in the art can be briefly described in the following Scheme 1, and such a method is carried out in an ordinary manner:

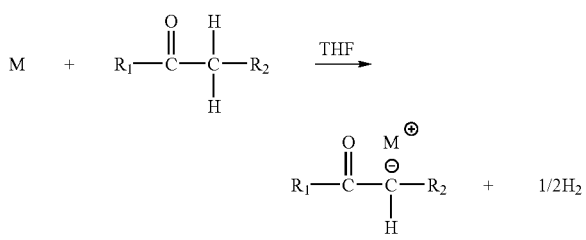

[Scheme 1]

wherein M is an alkali metal selected from the group consisting of Li, Na, K and Cs, and $R_1$ and $R_2$ represent an alkyl group or an aromatic group having 1 to 20 carbon atoms, respectively.

According to Scheme 1, a carbonyl compound is reacted with an equivalent amount of an alkali metal to prepare a metal enolate compound represented by Formula 1, and then degassed at high vacuum to remove hydrogen. The required reaction time is generally for about 72 hours.

In the metal enolate compound represented by Formula 1, preferably, M is a sodium atom (Na), and $R_1$ and $R_2$ represent an alkyl group, a phenyl group, a trifluoroalkylphenyl group or a naphthalene group having 1 to 20 carbon atoms, respectively.

Meanwhile, another feature of the present invention resides in a method for polymerizing isocyanates using the metal enolate initiator represented by Formula 1. The polymerization is an anionic polymerization generally used in the art, but not limited thereto.

The polymerization is generally carried out using an isocyanate monomer, an initiator, and an organic polymerization solvent. As the isocyanate monomer, an aliphatic isocyanate, an aromatic isocyanate, and the like may be used. Besides, an isocyanate substituted with various functional groups may be used. As the polymerization solvent, various organic solvents may be used and, preferably, tetrahydrofuran (THF) having high solubility to the isocyanate monomer is used.

The anionic polymerization is carried out at a high vacuum and an extremely low temperature generally in the art. In more detail, the anionic polymerization is performed in the pressure range of $10^{-5}$ to $10^{-7}$ torr, in the temperature range of $-30$ to $-110°$ C., and in the time range of 5 to 30 minutes. It is desirable that the pressure and temperature be maintained at a high vacuum and an extremely low temperature and, preferably, at $10^{-6}$ torr and $-98°$ C. If the pressure exceeds $10^{-5}$ torr or if the temperature exceeds $-30°$ C., it may cause the formation of trimers due to a backbiting reaction. Accordingly, it is preferable to maintain the above ranges.

The polymerization of isocyanates in accordance with the present invention can be illustrated in more detail with reference to the following Scheme 2:

[Scheme 2]

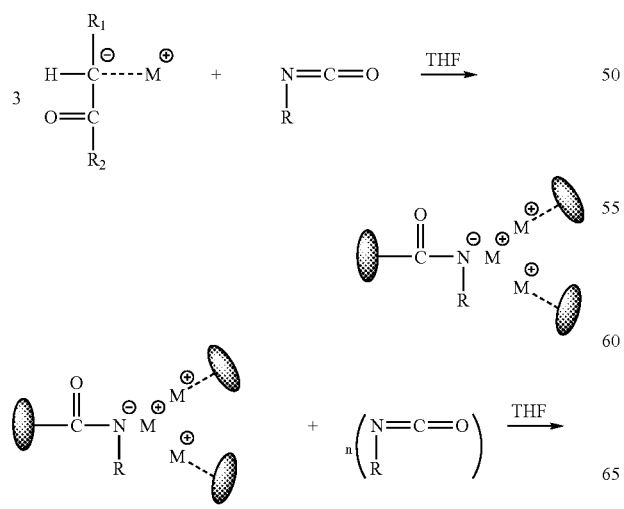

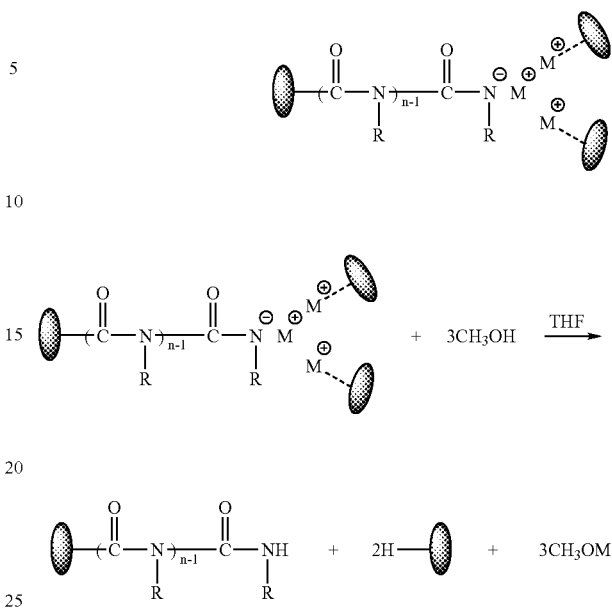

wherein M is an alkali metal selected from the group consisting of Li, Na, K, and Cs, $R_1$ and $R_2$ represent an alkyl group or an aromatic group respectively, and R represents an aliphatic group or an aromatic group.

The polymerization according to Scheme 2 will be described in more detail as follows. The isocyanate monomer is initiated using the metal enolate initiator of the present invention. The initial initiator exists in the form of a metal enolate, in which three initiator molecules form a cluster represented by the following Formula 2 by a weak interaction between an initiator molecule $M^+$ and carbonyl oxygens of adjacent initiator molecules. If the isocyanate monomer is added thereto, an O=C=N— ring of the monomer is attacked by a carbanion thereof to cause initiation.

[Formula 2]

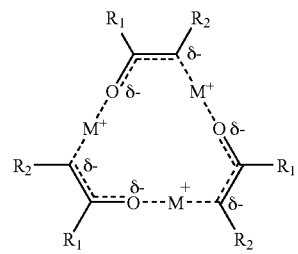

wherein M is an alkali metal selected from the group consisting of Li, Na, K, and Cs, and $R_1$ and $R_2$ represent an alkyl group or an aromatic group having 1 to 20 carbon atoms, respectively.

The initiation is brought about by one of the three initiator molecules constituting the cluster and, at the same time, the rest two initiator molecules protect stability of terminal anions at the end of the chain.

Next, the carbanions formed in the above are increased according as the isocyanate anion monomers are continuously supplied. That is, the carbanions are increased by attacking the O=C=N— ring of the isocyanate anion contained monomers. The two initiator molecules protecting the stability of the terminal anions at the end of the chain effectively prevent the formation of trimers due to the backbiting reaction.

Subsequently, if the carbanions are sufficiently increased, methanol is added instead of the isocyanate monomer to complete the polymerization.

Moreover, it is possible to control the molecular weight of the polyisocyanate, synthesized by carrying out the polymerization in accordance with the Scheme 2, with the amounts of the initiator and the polyisocyanate monomer used therein. For example, if the amount of the initiator introduced initially is 0.3 mmol and the amount of the monomer is 2 mmol, the entire molecular weight can be controlled by considering that twenty monomers adhere to one cluster formed by the three initiator molecules.

In carrying out the polymerization according to the present invention, it is possible to prepare a homopolymer of isocyanates with controlled molecular weight and molecular weight distribution using the metal enolate initiator represented by Formula 1, or it is also possible to prepare a block copolymer with controlled structure by block copolymerization of another monoisocyanate monomer with the initiator represented by Formula 1. It is thus possible to easily prepare a homopolymer and a copolymer of isocyanates using the polymerization method in accordance with the present invention Hereinafter, the present invention will be explained in more detail based on the following Examples, but the present invention is not limited thereto.

EXAMPLE 1

Poly(n-hexylisocyanate) was prepared using n-hexylisocyanate (HIC) shown in Table 1 in the following manner. The reaction conditions were −98° C. and $10^{-6}$ torr, and the reaction time was set to 5 to 15 minutes. To set the reaction temperature, liquid nitrogen was added to methanol contained in a constant temperature bath to freeze the methanol, and the temperature was measured using a low-temperature thermometer. Pale yellow sodium-deoxybenzoin (Na—DB) obtained by reacting sodium metal with an equivalent amount of deoxybenzoin in a tetrahydrofuran (THF) solvent was used as the initiator. The thus prepared initiator was immediately put into a glass ampoule under vacuum and then diluted to an appropriate concentration. A polymerization unit shown in FIG. 1, comprising the glass ampoule containing purified n-hexylisocyanate, i.e., an isocyanate monomer, the initiator prepared in the above-described manner, and a reaction terminator, was connected to a vacuum line to be in a high vacuum and nitrogen atmosphere. Then, the polymerization unit was sealed and removed from the vacuum line. After cleaning the inside of the polymerization unit once more using a cleaning solution, the glass ampoule containing the above-described reactants was broken in a prepared methanol constant temperature bath to feed the reactants into the polymerization unit. Subsequently, after the reactor inside and the reactants reached thermal equilibrium, the monomer was added thereto. The reaction was terminated by a hydrochloric acid-methanol mixture solution. The thus prepared polymer was precipitated in excess methanol and then vacuum-dried.

TABLE 1

| Classification | Polymerization component (mmol) | | Reaction time | Number-average molecular weight (Mn) | | Polydispersity index | Yield |
| --- | --- | --- | --- | --- | --- | --- | --- |
| | Na-DB [a] | HIC [b] | (min) | Calculated [c] | Measured [d] | (Mw/Mn) | (%) |
| Example 1-1 | 0.244 | 5.18 | 5 | 2580 | 8300 | 1.17 | 89 (11) [e] |
| Example 1-2 | 0.254 | 5.06 | 8 | 2650 | 8870 | 1.10 | 97 |
| Example 1-3 | 0.271 | 5.45 | 10 | 2750 | 8710 | 1.09 | 100 |
| Example 1-4 | 0.262 | 5.11 | 12 | 2620 | 8230 | 1.19 | 98 |
| Example 1-5 | 0.277 | 5.31 | 15 | 2530 | 8770 | 1.09 | 96 (4) [f] |

[a] Initiator: sodium-deoxybenzoin

[b] Isocyanate monomer: n-hexylisocyanate

[c] Calculated value: {(monomer content/initiator content) × molecular weight of hexylisocyanate (127.19) + molecular weight of deoxybenzoin (196.25)} × polymer yield/100

[d] Measured value: measured at 40° C. using gel permeation chromatography (GPC) and light scattering (LS) unit

[e] Monomer yield

[f] Trimer yield

Figure 3:
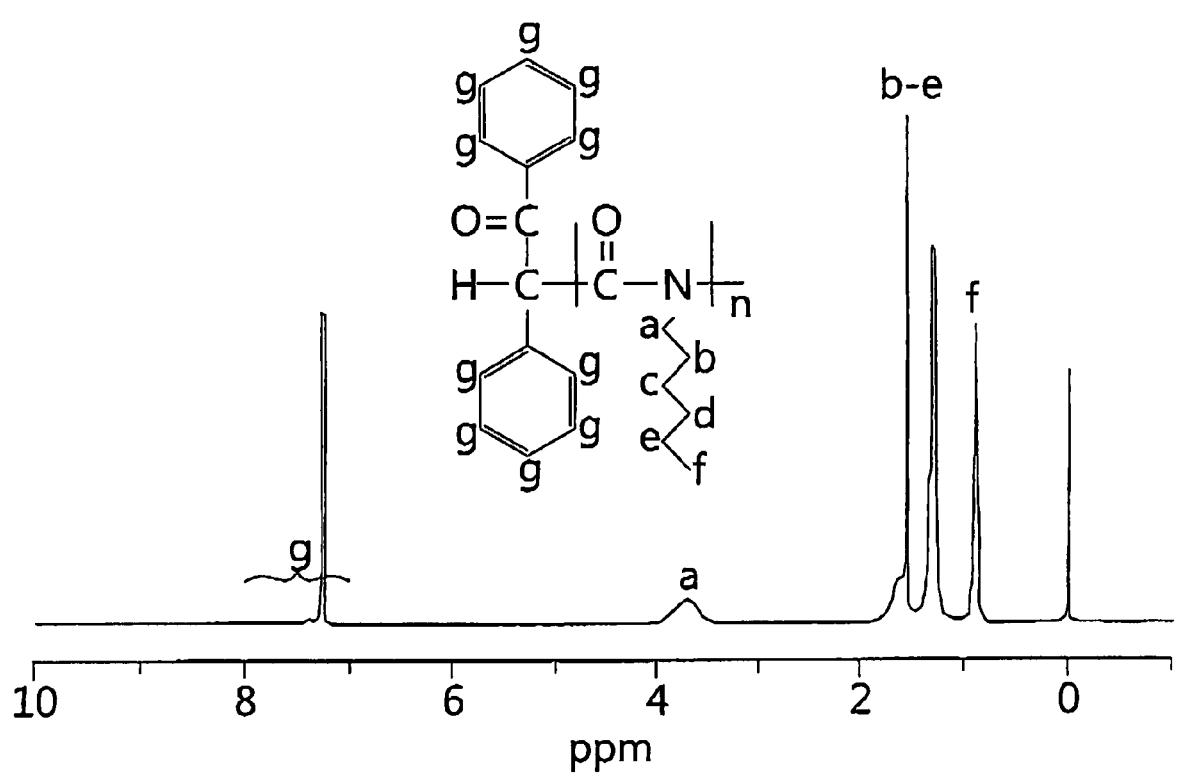
FIG. 3 is a $^1$H-NMR spectrum of poly(n-hexylisocyanate) prepared in Example 1-1.
Figure 4:
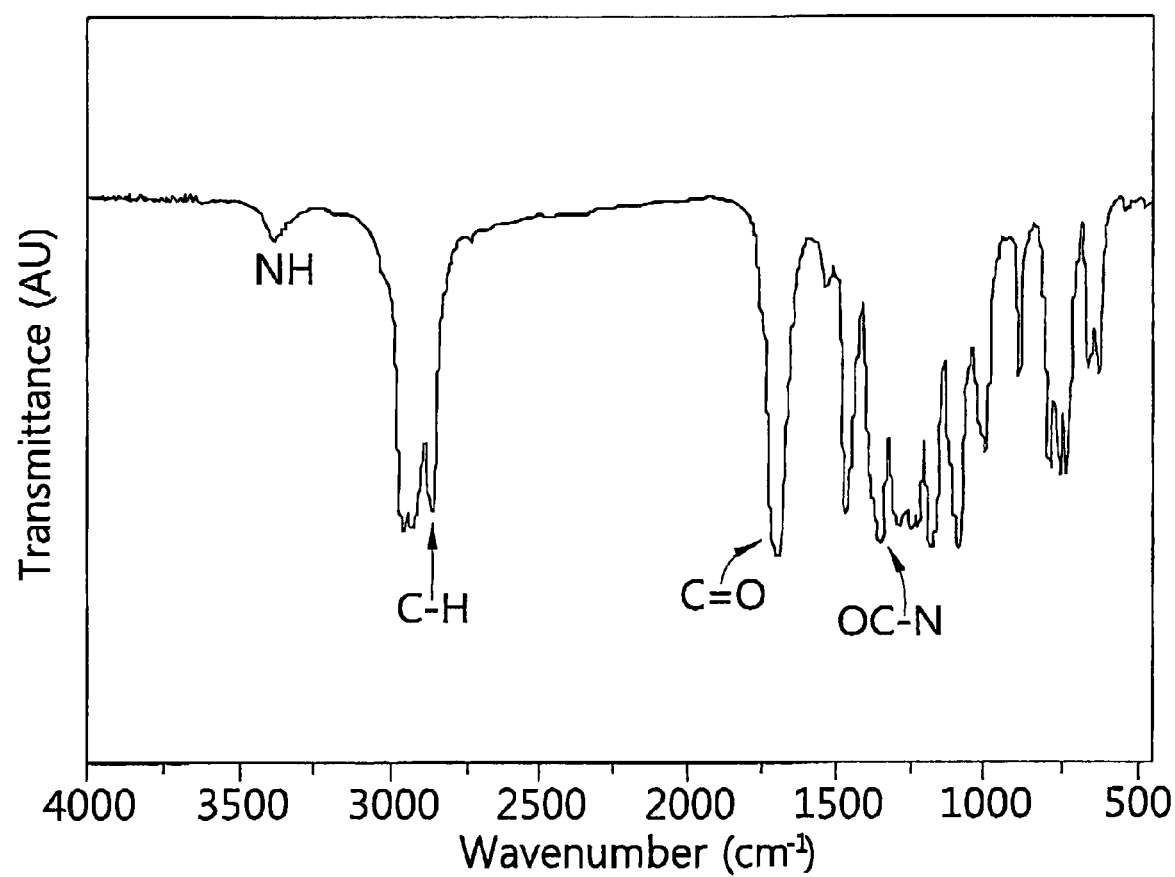
FIG. 4 is an FT-IR spectrum of poly(n-hexylisocyanate) prepared in Example 1-1.
Figure 5:
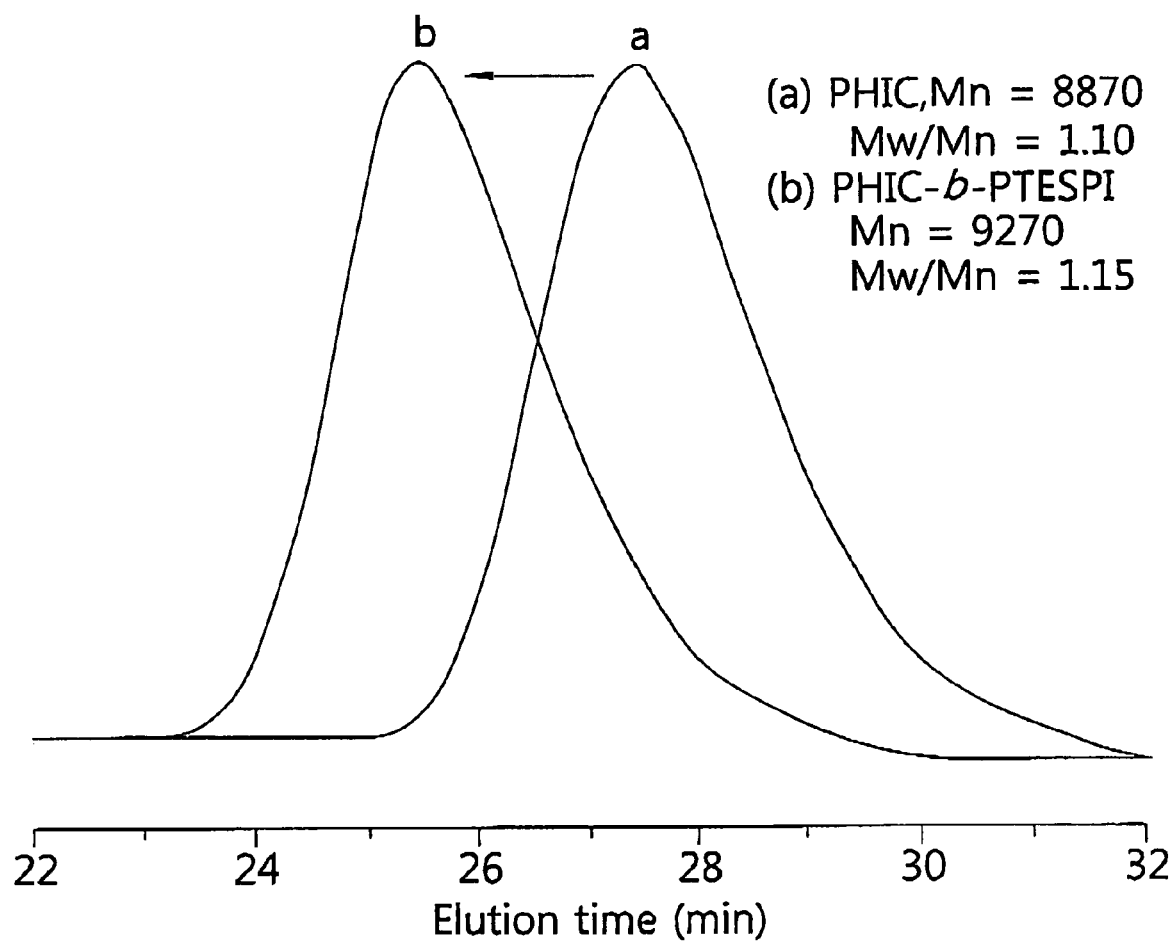
FIG. 5 is a GPC spectrum of poly(n-hexylisocyanate) prepared in Example 1-1 and poly(n-hexylisocyanate)-b-poly(3-(triethoxysilyl)propyl isocyanate) prepared in Example 4-1.

The structure of the poly(n-hexylisocyanate) prepared in Example 1-1 was identified from the results of a $^1$H-NMR spectrum of FIG. 3 and an FT-IR spectrum of FIG. 4. Moreover, it could be ascertained from the result of a GPC spectrum of FIG. 5 that the prepared poly(n-hexylisocyanate) had a controlled molecular weight.

EXAMPLE 2

Poly(n-hexylisocyanate) was prepared in the same manner as Example 1, except that the reaction molar ratio was differentiated as shown in the following Table 2 to examine the effects according to the change of the molecular weight during the polymerization. At this time, the reaction time was set to 10 minutes, which was the optimum reaction condition.

TABLE 2

| Classification | Polymerization component (mmol) | | Number-average molecular weight (Mn) | | Polydispersity index (Mw/Mn) | Yield (%) |
|---|---|---|---|---|---|---|
| | Na-DB [a] | HIC [b] | Calculated [c] | Measured [d] | | |
| Example 2-1 | 0.272 | 8.64 | 4240 | 11500 | 1.08 | 100 |
| Example 2-2 | 0.253 | 12.3 | 6330 | 19100 | 1.03 | 99 |
| Example 2-3 | 0.270 | 17.8 | 8390 | 24500 | 1.05 | 98 |
| Example 2-4 | 0.231 | 22.4 | 12300 | 35300 | 1.07 | 98 |

[a] Initiator: sodium-deoxybenzoin
[b] Isocyanate monomer: n-hexylisocyanate
[c] Calculated value: {(monomer content/initiator content) × molecular weight of hexylisocyanate (127.19) + molecular weight of deoxybenzoin (196.25)} × polymer yield/100
[d] Measured value: measured at 40° C. using gel permeation chromatography (GPC) and light scattering (LS) unit

EXAMPLE 3

Poly(3-(triethoxysilyl)propyl isocyanate) was prepared in the same manner as Example 1, except that 3-(triethoxysilyl)propyl isocyanate (TESPI) was used. At this time, the reaction time was set to 5 to 12 minutes, and the reaction was terminated by methanol. The thus prepared polymer was precipitated in excess methanol and then vacuum-dried.

Figure 2:
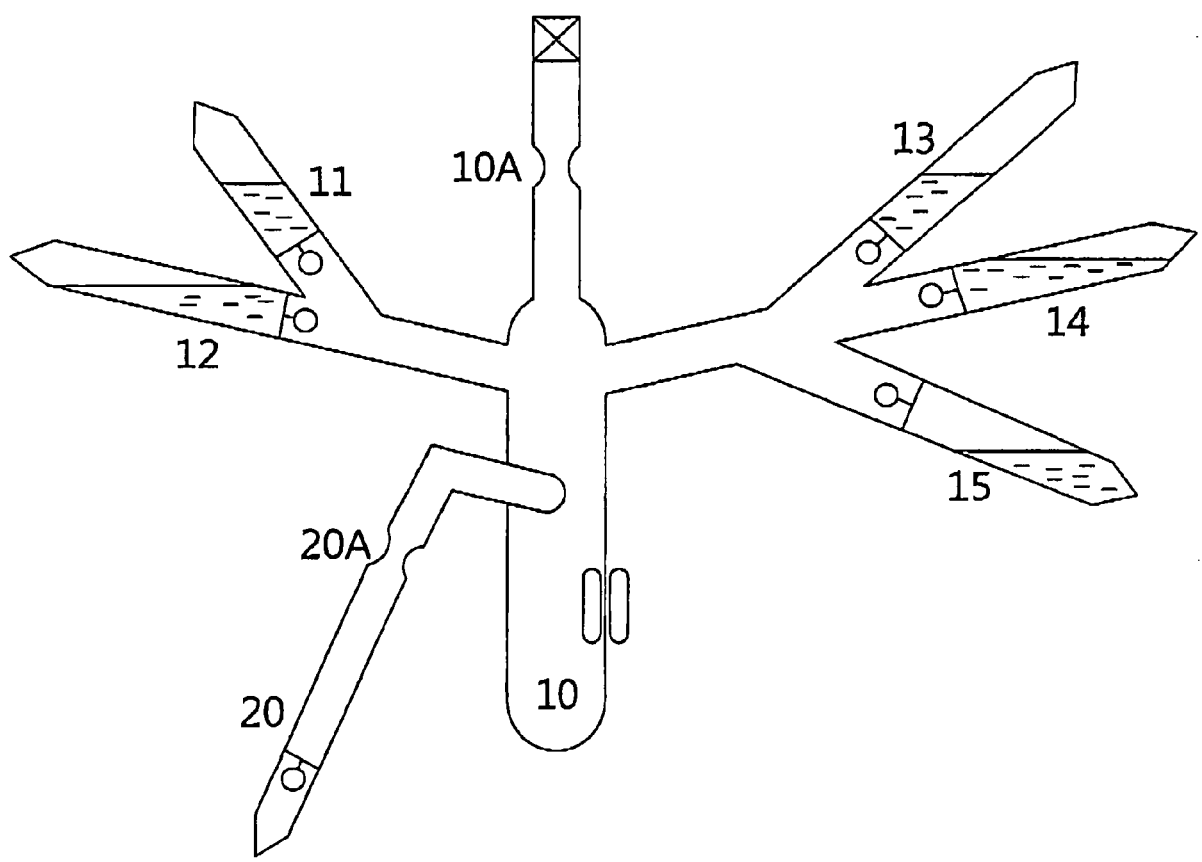
FIG. 2 is a schematic diagram of an anionic polymerization unit used in the synthesis of a block copolymer of the present invention.

The block copolymerization was carried out in the same manner as Example 1, except that n-hexylisocyanate as a first monomer was polymerized for 10 minutes using the polymerization unit of FIG. 2 and then 3-(triethoxysilyl)propyl isocyanate as a second monomer was polymerized for 8 minutes. Or, 3-(triethoxysilyl)propyl isocyanate as the first monomer was polymerized for 10 minutes and then n-hexylisocyanate

TABLE 3

| Classification | Polymerization component (mmol) | | Reaction time (min) | Number-average molecular weight (Mn) | | Polydispersity index (Mw/Mn) | Yield (%) |
|---|---|---|---|---|---|---|---|
| | Na-DB [a] | TESPI [b] | | Calculated [c] | Measured [d] | | |
| Example 3-1 | 0.242 | 3.83 | 5 | 2840 | 10400 | 1.13 | 69 (31) [e] |
| Example 3-2 | 0.242 | 3.83 | 8 | 3990 | 10700 | 1.11 | 97 |
| Example 3-3 | 0.244 | 3.97 | 10 | 3800 | 11300 | 1.11 | 90 (10) [f] |
| Example 3-4 | 0.245 | 3.69 | 12 | 3140 | 10700 | 1.12 | 80 (20) [f] |

[a] Initiator: sodium-deoxybenzoin
[b] Isocyanate monomer: 3-(triethoxysilyl)propyl isocyanate
[c] Calculated value: {(monomer content/initiator content) × molecular weight of 3-(triethoxysilyl)propyl isocyanate (247.37) + molecular weight of deoxybenzoin (196.25)} × polymer yield/100
[d] Measured value: measured at 40° C. using gel permeation chromatography (GPC) and light scattering (LS) unit
[e] Monomer yield
[f] Trimer yield

EXAMPLE 4

Block copolymerization of n-hexylisocyanate (HIC) and 3-(triethoxysilyl)propyl isocyanate (TESPI) was carried out to identify living characteristics.

as the second monomer was polymerized for 8 minutes. The reaction was terminated by methanol, and the thus prepared polymer was precipitated in excess methanol and then vacuum-dried.

TABLE 4

| Classification | Polymerization component (mmol) | | | Reaction time (min) | Number-average molecular weight (Mn) | | Polydispersity index (Mw/Mn) | Yield (%) |
|---|---|---|---|---|---|---|---|---|
| | Na-DB [a] | 1st monomer | 2nd monomer | | Calculated [d] | Measured [e] | | |
| Example 4-1 | 0.361 | HIC [b] 5.63 | TESPI [c] 3.42 | 10/8 | 4390 | 9270 | 1.15 | 97 |
| Example 4-2 | 0.255 | TESPI [c] 4.81 | HIC [b] 4.94 | 8/10 | 7180 | 19300 | 1.23 | 98 |

[a] Initiator: sodium-deoxybenzoin
[b] Isocyanate monomer: n-hexylisocyanate
[c] Isocyanate monomer: 3-(triethoxysilyl)propyl isocyanate
[d] Calculated value: {(1st monomer content/initiator content) × molecular weight of 1st monomer + (2nd monomer content/initiator content) × molecular weight of 2nd monomer + molecular weight of deoxybenzoin (196.25)} × polymer yield/100
[e] Measured value: measured at 40° C. using gel permeation chromatography (GPC) and light scattering (LS) unit As described above, if the polymerization of isocyanates is carried out using a specific metal enolate initiator in accordance with the present invention, it is possible to control the molecular weight of a polymer, thus obtaining the polymer with monodispersity and in a high yield. Moreover, if a chiral substance is introduced through an end-capping reaction by a carbonyl chloride compound, it is expected that it will have a high chirality. Accordingly, the polyisocyanate prepared in accordance with the present invention can be effectively used for preparing optical materials, such as liquid crystal materials, chiral materials, and optical switches. Furthermore, it is possible to prepare a nanoporous material by a sol-gel reaction from the block copolymer synthesized by controlling the composition ratio of the block copolymer in accordance with the present invention, and it is expected that the thus nanoporous material can be used as a material having a low dielectric constant.

As above, preferred embodiments of the present invention have been described and illustrated, however, the present invention is not limited thereto, rather, it should be understood that various modifications and variations of the present invention can be made thereto by those skilled in the art without departing from the spirit and the technical scope of the present invention as defined by the appended claims.

What is claimed is:

1. A method for polymerizing isocyanates by anionic polymerization using an isocyanate monomer and an initiator, wherein the initiator is a metal enolate initiator represented by the following Formula 1:

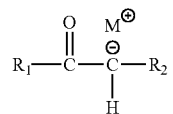

[Formula 1]

wherein M is an alkali metal selected from the group consisting of Li, Na, K, and Cs, and $R_1$ and $R_2$ represent an alkyl group or an aromatic group having 1 to 20 carbon atoms, respectively.

2. The method of claim 1, wherein the anion polymerization is carried out in the pressure range of $10^{-5}$ to $10^{-7}$ torr, in the temperature range of $-30$ to $-110°$ C., and in the time range of 5 to 30 minutes.

3. The method of claim 1, wherein the polyisocyanate is a homopolymer or a copolymer.

* * * * *